United States Patent

Dalal et al.

Patent Number: 5,273,204
Date of Patent: Dec. 28, 1993

[54] METHOD FOR JOINING MATERIALS BY METAL SPRAYING

[75] Inventors: Ranes P. Dalal; John M. McFadden; Mark J. Straszheim, all of N. Muskegon; Louis E. Dardi, Muskegon, all of Mich.

[73] Assignee: Howmet Corporation, Greenwich, Conn.

[21] Appl. No.: 173,468

[22] Filed: Mar. 25, 1988

[51] Int. Cl.$^5$ .............................. B23K 10/02
[52] U.S. Cl. ...................... 228/166; 228/165; 228/231; 228/232; 419/47
[58] Field of Search .............. 419/5, 8, 47, 48; 228/165, 166, 231, 232

[56] References Cited

U.S. PATENT DOCUMENTS

| | | | |
|---|---|---|---|
| 3,948,432 | 4/1976 | Pryor et al. | 228/223 |
| 4,113,166 | 9/1978 | Olsson | 228/243 |
| 4,164,311 | 8/1979 | Swisher | 228/165 |
| 4,326,117 | 4/1982 | Kanne | 228/165 |
| 4,331,286 | 5/1982 | Miyazaki et al. | 228/198 |
| 4,392,296 | 7/1983 | Kanamaru et al. | 29/520 |
| 4,459,062 | 7/1984 | Siebert | 228/165 |
| 4,555,835 | 12/1985 | Buzzi et al. | 228/165 |
| 4,559,246 | 12/1985 | Jones | 228/263.17 |
| 4,640,532 | 2/1987 | Pope | 285/286 |

*Primary Examiner*—Donald P. Walsh
*Assistant Examiner*—Daniel Jenkins
*Attorney, Agent, or Firm*—Finnegan, Henderson, Farabow, Garrett & Dunner

[57] ABSTRACT

A method of joining metal materials by spraying molten metal into a cavity between the articles to be joined. Prior to deposition of the metal, the surface of the cavity is cleaned and the articles to be joined are preheated. Subsequent to deposition of the metal within the cavity, the joined articles are cooled at a rate that precludes damage due to thermal effects and the deposited metal is consolidated in the cavity by hot pressing.

28 Claims, 2 Drawing Sheets

200 X

500 X

METHOD FOR JOINING MATERIALS BY METAL SPRAYING

BACKGROUND OF THE INVENTION

The present invention relates to a method of joining metals for use at high temperature, especially superalloy materials. The evolution of advanced alloys for service at high temperature has resulted in the development of a number of alloy systems that are very difficult to fabricate and join. The development of modern nickel-base superalloys has produced compositions for use in modern gas turbine engines which have increasingly higher volume fractions of the gamma prime phase, typically $Ni_3(Al,Ti)$. The increased aluminum and titanium contents, while significantly increasing high temperature creep strength and rupture life for more demanding engine performance requirements, have reduced the ductility of the alloys and thereby increased their susceptibility to cracking and fissuring during welding.

In addition, the heat associated with welding processes affects the structure of such alloys. Columnar-grained and single crystal articles lose their respective crystallographic orientation during the melting of welding. Thus, many of the advanced superalloys and oriented structures cannot be joined by welding and are considered unweldable. The inability to weld more complex shapes limits design and cost flexibility for a designer attempting to use such materials. The use of mechanical attachment, diffusion bonding, and advanced brazing techniques have been the only fabrication alternatives available in the prior art where welding is not viable. Each of these alternatives has inherent limitations.

The most common methods of welding generate heat in a localized area causing melting and fusion of the metal. Welding processes that may be useful with superalloys are gas-metal arc (GMA), gas-tungsten arc (GTA), plasma arc (PA), or electron beam (EB).

Hot cracking during welding and post-weld heat treatment (strain age cracking) are commonly observed in the nickel-base superalloys due to the aluminum and titanium in the gamma ($\gamma$) and gamma prime ($\gamma'$) strengthening phases. All welded joints produce a reduction in mechanical properties, especially ductility since the structure of solidified weld metal is more segregated. If high electron vacancy elements segregate on solidification of the weld, embrittling precipitates such as sigma ($\sigma$) or mu ($\mu$) can form. Heat affected zones exposed to high temperatures are susceptible to grain growth, solutioning, and reprecipitation of carbides and other phases leading to property degradation, including corrosion and oxidation resistance. By contrast, solid solution cobalt-base alloys can be readily welded.

Diffusion bonding methods, such as vacuum hot pressing, have been partially successful in joining superalloys, but extensive surface preparation and costly fixturing must be employed. Also, dissimilar alloys can result in undesirable phases or Kirkendall porosity from the long exposures to elevated temperature and pressure.

Brazing methods employ the use of a lower melting point filler alloy. The more advanced methods utilize boron as a melting point depressant which can be diffused away from the joint during post braze thermal treatment. Even the most advanced processes, however, provide less than 80% of parent metal strength, are of limited ductility, and exhibit undesirable low-melting phases (e.g., borides, silicides). These braze joint characteristics typically result in increased sensitivity to cracking, microfissuring, and consequently, to reduced low cycle fatigue endurance.

It is an objective of this invention to overcome the limitations of conventional joining processes by eliminating: the segregation in the the joint, deleterious precipitate phases, the significant reduction in mechanical properties in the joint, and the alteration of grain structure of the articles being joined.

Accordingly, it is an objective of this invention to join relatively unweldable components by the use of a spray cast interlayer at joint surfaces.

Additional objectives and advantages will be set forth in part of the description which follows, and in part, will be obvious from the description, or may be learned from the practice of the invention.

SUMMARY OF THE INVENTION

To achieve these and other objects of the invention, there is provided a method of joining two metal articles by spraying molten metal into a cavity therebetween. The method comprises the steps of providing a first and second metal member. The first and second metal members are placed adjacent one another and a cavity is provided between the first and second metal member disposed to receive a deposit of sprayed metal to join the first and second members. The formation of a metallurgical bond is facilitated at the interface between the surface of the cavity and the metal sprayed thereon by cleaning the surface of the cavity and preheating the metal members in a controlled atmosphere at low pressure. Molten metal is then sprayed into the cavity without substantial melting of the surface of the cavity. The molten metal rapidly solidifies incrementally within the cavity to form a solid partially porous sprayed metal portion. This partially porous sprayed metal portion substantially fills the cavity and is adherent to at least a portion of the surface of the cavity to join the two metal members. Residual stresses are minimized at the interface by cooling the joined metal members at a sufficiently low cooling rate. The joined metal members are hot pressed to substantially eliminate voids in the sprayed metal portion and metallurgically bond the sprayed metal portion to the surface of the cavity.

Preferably, the method includes the steps of forming a gas impervious layer on the surface of the partially porous sprayed metal portion and hot isostatically pressing the joined metal members. It is further preferred that the metal members comprise nickel. It is further preferred that when the metal members are nickel, they are preheated in the range of from about 1500° to 1800° F. It is further preferred that the step of preheating the metal members comprise impinging a high velocity thermal plasma on the metal members.

BRIEF DESCRIPTION OF THE DRAWINGS

The following drawings which are incorporated herein and constitute a portion of the present specification.

DESCRIPTION OF THE PREFERRED EMBODIMENTS

The present invention will now be described in terms of preferred embodiments that are illustrative of the invention.

The invention is a method of joining two metal members by spraying molten metal into a cavity therebetween. The method finds particular utility in joining metal articles for service at high temperatures. The present invention can be used to join metal articles having microstructures uniquely disposed for high temperature properties without the degradation associated with melting of the materials to be joined. For example, single crystal materials can be joined to one another or a fine-grained material joined to a single crystal material or one having directionally solidified grains. The invention shows particular utility with nickel-base alloys, however, other alloys or the so-called superalloys can be joined by the techniques of the present invention.

In accordance with the invention there are provided first and second metal members. The first and second metal members are placed adjacent one another. As here embodied and schematically depicted in FIG. 1, members 10 and 10' are placed adjacent one another on a support member 11.

Figure 1:
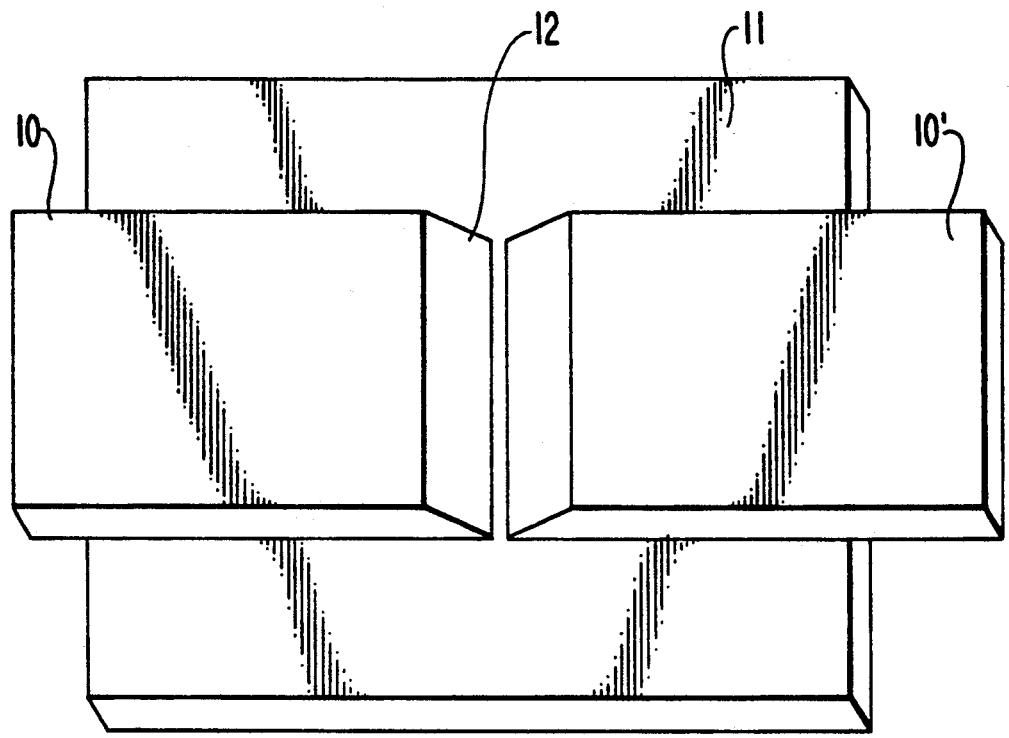
FIG. 1 is a perspective schematic view of articles to be joined by practice of the present invention.

In accordance with the invention a cavity is provided between the first and second metal members disposed to receive a deposit of sprayed metal to join the first and second members. As here embodied and depicted schematically in FIGS. 1 and 2 the first and second metal members 10 and 10' define and include a V-shaped cavity 12 therebetween. While the V-shaped cavity is known to be operable in connection with the present invention, other configurations of the cavity are also possible. In such an embodiment the source of sprayed metal is moved along the length of the cavity to deposit sprayed molten metal therein. The cavity need not be linear as depicted in FIG. 1 as long as the source of sprayed metal can follow the lengthwise dimensions of the cavity. The only factor known to be significant with respect to the configuration of the cavity is that any re-entrant angles associated with the surface of the articles defining the cavity must not be so significant in size that when molten metal is deposited within the cavity any resultant nonfilled portion of the cavity cannot be closed through subsequent compaction of the deposited material. It is the primary function of the cavity to provide an interface between the deposited material and the articles being joined such that the final article has the appropriate strength.

In certain configurations it may be desirable to have the two metal members slightly separated so that there is sufficient deposited material between the two members at the bottom of the cavity. In such a case, a third member may be used to define a portion of the cavity. As here embodied and depicted in FIG. 1, there is included a support member 11 that closes the cavity 12 by filling the gap between the two articles 10 and 10'. Once the material has been deposited within the cavity, however, the cavity is defined by the surface of the previously deposited material. Once the two articles (here 10 and 10') are joined, the support member may be removed.

It is the purpose of the present invention to join the two articles by forming a metallurgical bond at the interface between the members to be joined and the material deposited within the cavity. For purposes of the present invention, a metallurgical bond is a continuous metallic structure at the interface of the members being joined. In such an embodiment a metallurgical bond between the surface of the cavity and the deposited metal is facilitated by the cavity and the outermost region of the material deposited therein being gas impervious. As a result, gas pressure applied during hot isostatic pressing densifies the sprayed metal and eliminates both microscopic porosity and any voids in the spray deposited material within the cavity. As used herein, the term "surface of the cavity" is used to mean the surface of the articles that initially defines the cavity or the surface of the material previously deposited within the initial cavity.

In accordance with the invention, the formation of a metallurgical bond at the interface between the surface of the cavity and the metal sprayed thereon is facilitated by cleaning the surface of the metal member and preheating it in a controlled atmosphere at low pressure. The formation of a metallurgical bond is difficult if the surface of the cavity has impurities such as oxides or the like, either as a continuous oxide layer or discontinuous oxide particles. Therefore, the method of the present invention preferably includes the cleaning of the surface of the metal member. In a preferred embodiment the process includes the step of cleaning the surface of the metal member in a plasma by forming a direct current arc on the surface of the cavity with the surface of the cavity being the cathode. Such a process is known as reverse arc cleaning and is described in an article by Shankar et al. in the October 1981 issue of the *Journal of Metals*. Reverse arc cleaning removes surface impurities when such a step is conducted in a controlled atmosphere at low pressure. If the process parameters of the reverse arc cleaning step are not appropriate, the surface being cleaned may be melted. This may cause degradation of the properties of the articles being joined at the interface if the amount of material that is melted during cleaning is substantial. In the embodiments disclosed herein, the vessel containing the articles to be joined was initially evacuated to below $10^{-3}$ Torr and the DC arc was generated in an atmosphere of argon and helium at a pressure in the range of 30 to 50 Torr during the cleaning process. Cleaning can be accomplished by the reverse arc cleaning step previously described both as a single step or in multiple steps. In addition, the surface of the cavity may be machined or chemically cleaned prior to the preheating step to eliminate any impurities that would impair the formation of a metallurgical bond at the interface between the cavity and the metal spray deposited therein.

In accordance with the invention, the solid metal members are preheated in a controlled atmosphere at low pressure. The preheating of the solid metal member affects the rate of heat transfer as the molten metal spray strikes the solid surfaces on which it is deposited. Because steep thermal gradients can result in residual stresses across the interface, the amount of preheating must be taken into consideration to minimize such gradients. For nickel-base alloys, preheating the solid metal member to a temperature in the range of from 1500° to 1800° F. is preferred. One of the advantages of the present invention is that the solid metal member can be preheated with an arc or by means of a plasma prior to the application of the sprayed molten metal, thereby providing an efficient production process capable of being automated.

In accordance with the invention, molten metal is sprayed into the cavity without substantially melting of the surface of the cavity. Preferably, the molten metal is sprayed by means of the introduction of powdered metal into a high velocity thermal plasma. Particular success has been experienced using a plasma spray apparatus manufactured by Electro-Plasma Inc., of Irvine, Calif. Such an apparatus generates a high temperature plasma of flowing inert ga into which a solid metal powder is injected. The metal powder is melted by the high temperature plasma and projected, by movement of the plasma, toward the cavity receiving the molten metal. To ensure a uniform deposition of the sprayed molten metal into the cavity receiving it, the solid metal members may be moved or the plasma gun indexed in order to provide a configuration to the deposited material appropriate for the particular application.

Where the cavity receiving the molten metal has an irregular configuration, it may be necessary to move both the solid metal members as well as the means for projecting the spray of molten metal in order to minimize the formation of voids at the interface between the cavity and the deposited material. The formation of voids at the interface is not desirable but is not entirely detrimental to the successful practice of the invention. The deposited material is adherent to at least a portion of the surface of the cavity. The deposited metal may be porous or there may be voids at the interface between the surface of the cavity and the deposited metal. Because the process is conducted with a controlled atmosphere, the surface of both the cavity and the metal deposited therein should be free of surface contamination. Thus, subsequent consolidation techniques such as hot isostatic pressing should close any minor voids at the interface and provide a metallurgical bond between the deposited material and the solid metal member at the interface. In such a manner, the deposited metal may be porous but such porosity is of little consequence because of the consolidation step that is used to impart almost full theoretical density to the deposited material.

The molten metal sprayed into the cavity is rapidly solidified because of the temperature differential between the molten metal and the first and second metal members even when they are preheated. This affords the opportunity to control the microstructure of the deposited material. By controlling the deposition rate onto the cavity, the velocity of the molten metal spray, the droplet size of the molten metal spray, and the temperature differential between the metal spray and the first and second metal members, the crystalline structure of the deposited metal may be controlled. The molten metal solidifying incrementally to either the metal members or a previously deposited portion as the now solid material builds up as depicted schematically in FIG. 2.

In accordance with the invention, the method includes the step of minimizing the residual stresses at the interface between the deposited material and the cavity by cooling the joined metal members at a sufficiently low cooling rate. The cooling rate is somewhat dependent on the preheat temperature of the two solid metal members. For nickel-base materials it has been found that a cooling rate in the range of from about 800° to 1500° F./hr is sufficient to bring the device to room temperature without causing detrimental residual stresses within the joined metal members.

In accordance with the invention, the joined metal members are hot pressed to substantially eliminate the voids in the sprayed metal portion and to metallurgically bond the sprayed metal portion of the surface of the cavity. Preferably, this hot pressing is done under gas pressure thereby providing an isostatic pressure to the joined metal members. In configurations that do not require the isostatic pressure, hot pressing of the joined metal members by mechanical means can be sufficient to both densify the deposited material and to eliminate voids therein. Subsequent to the consolidation of the article by hot isostatic pressing or hot pressing, the article can be heat treated to obtain the desired microstructure for both the newly deposited material and the two metal members receiving the deposited material.

Figure 2:
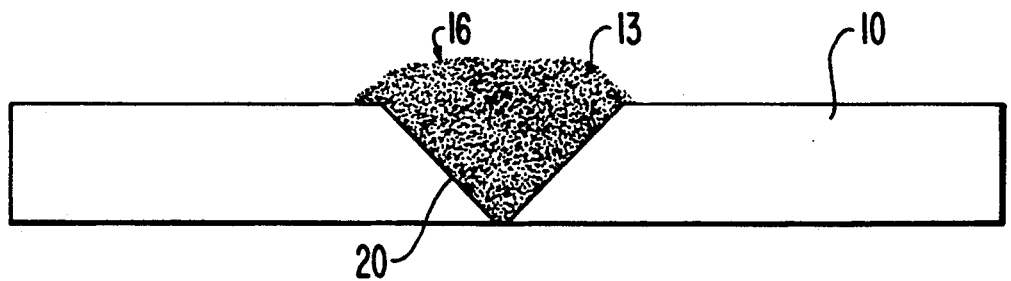
FIG. 2 is a schematic cross section of two articles joined by means of the present invention.

In the preferred embodiment where the deposited material is consolidated by hot isostatic pressing, the process should include the formation of a gas impervious layer on the surface of the partially porous sprayed metal portion. This provides the means of applying the gas pressure during hot isostatic pressing to densify the deposited material and eliminate any voids therein. The gas impervious layer can be formed by controlling the parameters of metal spraying and the spatial relationship of the metal spraying means with respect to the previously deposited material such that the sprayed layer is gas impervious. In the embodiment depicted in FIG. 2 where the article is consolidated by hot isostatic pressing, there should be a gas impervious bond between the edge of the deposited material 13 and the cavity 12 shown as the edge portion 16 so that gas pressure applied during hot isostatic pressing does not infiltrate to the interface 20 between the deposited material 13 and the surface of the cavity 12, thus preventing the elimination of the voids at that location. As shown in FIG. 2, the outer most portion 16 of the solidified metal portion 13 is also substantially gas impervious, thus facilitating consolidation by hot isostatic pressing of the spray deposited material 13.

The present invention has been successfully practiced with isostatic pressures of 15 to 25 KSI at temperatures of between 2125° to 2200° F. Those in the art will recognize that superalloy materials having very fine grain sizes, such as those exhibited by the spray deposited material of this invention, will behave superplastically at temperatures of about 1800° to 2200° F. Thus, the step of hot isostatic pressing in connection with the invention could be carried out in that temperature range.

The present invention provides a method for joining materials not capable of being welded by conventional techniques. Thus, the present invention has particular utility joining nickel-base alloys having a combined titanium and aluminum content in excess of about 3.5 weight percent. The following commercially useful alloys are exemplary of such materials that may be joined using the present invention: Rene N4, Rene 80, Rene 125, Mar-M200, Mar-M200+HF, Mar-M247, Mar-M421, Monoloy 454, IN 100, IN 713, IN 738, IN 792, B-1900, U-500 and U-700.

The present invention has ben utilized in several examples where the compositions referred to are those set out in the following Table:

TABLE I

COMPOSITION OF NICKEL BASE SUPERALLOY

| Element (w/o) | Cast Alloy Mar-M247 | Monoloy 454 | Powder Alloy Mar-M247 |
|---|---|---|---|
| Ni | Bal | Bal | Bal |
| Cr | 8.0 | 10.0 | 8.4 |
| Co | 10.0 | 5.0 | 9.5 |
| Mo | 0.6 | — | 0.60 |
| W | 10.0 | 4.0 | 9.7 |
| Ta | 3.0 | 12.0 | 3.0 |
| Al | 5.5 | 5.0 | 5.4 |
| Ti | 1.0 | 1.5 | 1.0 |
| Hf | 1.5 | — | 1.4 |
| C | 0.16 | — | 0.04 |
| B | 0.02 | — | 0.015 |
| Zr | 0.09 | — | 0.05 |

EXAMPLE 1

Two one-half inch thick plates of investment cast Mar-M247 nickel-base superalloy having an equiaxed grain structure were joined by the present invention as shown in FIGS. 1 and 2. One end of each plate 10 and 10' was chamfered at 45° to form a cavity 12. The cavity surfaces were then cleaned by conventional ceramic media blasting and ultrasonic cleaning. The plates 10 and 10' were supported on a support member 11 as shown in FIG. 1.

The plates and fixture were positioned inside of a vacuum chamber and were oriented normal to a plasma gun. After evacuating the chamber below about $10^{-3}$ Torr, a DC arc plasma gun (manufactured by Electro-Plasma Inc. of Irvine, Calif.) was started using high purity argon and helium to preheat the plates to about 1800° F. The gun was operated at 68 kW and the chamber pressure was controlled to 30-50 Torr during processing. The cavity surfaces 12 were then electrically cleaned by negatively biasing the plates relative to the plasma gun with an imposed current as described in the aforementioned publication to Shankar et al. After this final cleaning, a molten filler metal, in this case also Mar-M247 alloy, was sprayed onto the cavity incrementally forming the joint metal 13 shown in FIG. 2 by rapid solidification. The joined plates were cooled in the chamber under vacuum. The fabricated structure exhibited metallurgically bonded interfaces and gas impervious surfaces in the joint area.

Figure 3:
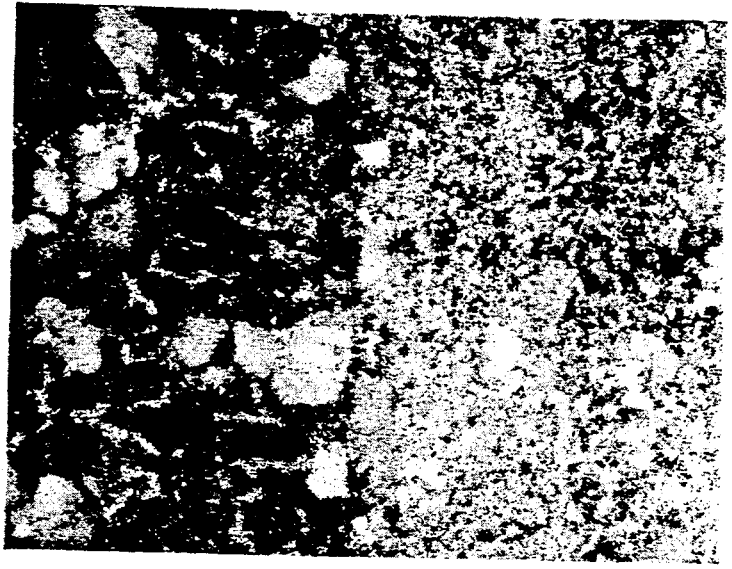
FIG. 3 is a photomicrograph at 200X depicting the joined area formed in one of the examples.

The joined plates were hot isostatically pressed at 2165° F./25 KSI/4 h to eliminate residual porosity and enhance metallurgically bonding of the plates to the joint metal. A photomicrograph of the bond area as shown in FIG. 3 at 200 x magnification shows the complete metallurgical integrity of the joint. No cracks were found in the cast Mar-M247 plates near the joint as are common with fusion welding methods of the prior art.

EXAMPLE 2

Figure 4:
FIG. 4 is a photomicrograph at 500X showing the joined area of one of the examples.

Plates of single-crystal investment cast nickel base superalloy known as Monoloy 454 were joined with Mar-M247 filler metal by the method described in Example 1. The single crystal plates were solution treated prior to surface cleaning to prevent stress induced recrystallization of the bond surfaces. A photomicrograph of the joined plates shown in FIG. 4 demonstrates the integrity of the metallurgical bond and an absence of recrystallization of the single crystal, joint microcracking, or deleterious phases usually present in the joint when conventional joining methods are used.

The present invention has been disclosed in terms of preferred embodiments. The scope of the invention is not limited to the preferred embodiments but is determined by the appended claims and their equivalents.

What is claimed is:

1. A method of joining two metal members by spraying molten metal into a cavity therebetween, said method comprising the steps of:
   providing a first metal member;
   providing a second metal member;
   placing said first and said second metal members adjacent one another;
   providing a cavity between said first and second metal members disposed to receive a deposit of sprayed metal to join said first and second members;
   facilitating the formation of a metallurgical bond at the interface between the surface of s id cavity and metal sprayed thereon by cleaning the surface of said cavity and preheating said metal members in a controlled atmosphere at low pressure;
   spraying molten metal into said cavity without substantial melting of the surface of said cavity;
   rapidly solidifying said molten metal incrementally within said cavity to form a solid partially porous sprayed metal portion, said metal portion substantially filling said cavity and being adherent to at least a portion of the surface of said cavity to join said two metal members;
   reducing residual stresses at said interface by cooling said joined metal members at a sufficiently low cooling rate; and
   hot pressing said joined metal members to substantially eliminate voids in said sprayed metal portion and metallurgically bond said sprayed metal portion to the surface of said cavity.

2. The method of claim 1 including the steps of forming a gas impervious layer on the surface of said partially porous sprayed metal portion and hot isostatically pressing said joined metal members.

3. The method of claim 1 wherein said metal members comprise nickel.

4. The method of claim 3 wherein said metal members are preheated in the range of from about 1500° F. to about 1800° F.

5. The method of claim 1 wherein the step of preheating said metal members comprises impinging a high velocity thermal plasma on said metal members.

6. The method of claim 5 wherein the step of cleaning said cavity is accomplished by forming a direct current arc on the surface of said cavity, the surface of said cavity being the cathode.

7. The method of claim 1 wherein the steps of providing a cavity comprises providing a support member having a surface disposed to define a portion of said cavity.

8. The method of claim 1 wherein the step of spraying molten metal is accomplished by injecting powdered metal into a plasma directed at said cavity.

9. The method of claim 8 wherein said powdered metal comprises nickel.

10. The method of claim 1 including the step of moving said metal members with respect to means for spraying said molten metal while spraying said molten metal into said cavity.

11. The method of claim 1 wherein said first metal member comprises a directionally solidified metal member.

12. The method of claim 1 wherein said first metal member comprises a single crystal metal member.

13. A method of joining a single crystal member to a fine-grained metal member, said method comprising the steps of:
providing a first metal member, said first metal member being a single crystal;
providing a second metal member having a fine-grained microstructure;
placing said first and second metal members adjacent one another;
providing a cavity between said first and second metal members disposed to receive a deposit of sprayed metal to join said first and second metal members;
facilitating the formation of a metallurgical bond between said first and second metal members by cleaning the surface of said cavity, said cleaning step being in a controlled atmosphere at low pressure;
preheating said first and second metal members in a controlled atmosphere at low pressure;
spraying molten metal within a high velocity thermal plasma into said cavity without substantial melting of the surface of said cavity;
rapidly solidifying said molten metal incrementally to form a fine-grained solid partially porous sprayed metal portion adherent to at least a portion of said cavity to form a joined article;
forming a gas impervious layer on the surface of said partially porous sprayed metal portion;
reducing residual stresses in said joined article by cooling said joined article at a sufficiently low cooling rate; and
hot isostatically pressing said joined article to substantially eliminate voids in said sprayed metal portion to achieve near theoretical density and metallurgically bond said sprayed metal portion to said first and second metal members.

14. A method of joining two metal members by spraying molten metal into a cavity therebetween, said method comprising the steps of:
providing a first metal member;
providing a second metal member;
placing said first and second metal members in an abutting relationship;
providing a cavity between said first and second metal members disposed to receive a deposit of sprayed metal to join said first and second metal members;
facilitating the formation of a metallurgical bond at the interface between the surface of said cavity and metal sprayed thereon by cleaning the surface of said cavity and preheating said first and second metal members in a controlled atmosphere at low pressure;
spraying molten metal into said cavity without substantial melting of the surface of said cavity;
rapidly solidifying said molten metal incrementally within said cavity to form a solid partially porous sprayed metal portion, said metal portion substantially filling said cavity and being adherent to at least a portion of the surface of said cavity to form a joined article, with the outermost portion of the solidified metal portion being substantially gas impervious;
reducing residual stresses at said interface by cooling said joined article at a sufficiently low cooling rate; and
hot isostatically pressing said joined articles to substantially eliminate voids in said sprayed metal portion and metallurgical bond said sprayed metal portion to the surface of said cavity.

15. The method of claim 14 wherein said joined article comprises nickel.

16. The method of claim 15 wherein said metal members are preheated in the range of from about 1500° F. to 1800° F.

17. The method of claim 14 wherein the step of preheating said metal members comprises the step of impinging a high velocity thermal plasma on said metal members.

18. The method of claim 17 wherein the step of cleaning the surface of said cavity is accomplished by forming a direct current arc on the surface of said cavity, the surface of said cavity being the cathode.

19. The method of claim 14 wherein the step of spraying molten metal is accomplished by injecting powdered metal into a high velocity thermal plasma directed at said cavity.

20. The method of claim 19 wherein said powdered metal comprises nickel.

21. The method of claim 20 including the step of moving said metal members with respect to means for spraying said molten metal while spraying said molten metal into said cavity.

22. The method of claim 14 wherein the steps of providing a cavity comprises providing a support member having a surface disposed to define a portion of said cavity.

23. A method of joining two metal members by spraying molten metal into a cavity therebetween, said method comprising the steps of:
providing a first metal member;
providing a second metal member;
placing said first and second metal members in an abutting relationship;
providing a cavity between said first and second metal members disposed to receive a deposit of sprayed metal to join said first and second metal members;
facilitating the formation of a metallurgical bond at the interface between the surface of said cavity and metal sprayed thereon by cleaning the surface of said cavity and preheating said metal members in a controlled atmosphere at low pressure;
injecting metal powder into a high-velocity thermal plasma directed at said cavity to form a spray of molten metal;
spraying molten metal into said cavity without substantial melting of the surface of said cavity;
rapidly solidifying said molten metal incrementally within said cavity to form a solid partially porous sprayed metal portion, said metal portion substantially filling said cavity and being adherent to at least a portion of the surface of said cavity to form a joined article, with the outermost portion of the solidified metal portion being substantially gas impervious;
reducing residual stresses at said interface by cooling said joined article at a sufficiently low cooling rate; and
hot isostatically pressing said joined article to substantially eliminate voids in said sprayed metal portion and metallurgical bond said sprayed metal portion to the surface of said cavity.

24. The method of claim 23 wherein said metal members comprises nickel.

25. The method of claim 24 wherein said metal members are preheated in the range of from about 1500° F. to 1800° F.

26. The method of claim 24 wherein the step of preheating said metal members comprises the step of impinging a high-velocity thermal plasma on said metal members.

27. The method of claim 26 wherein the step of cleaning the surface of said cavity is accomplished by forming a direct current arc on the surface of said cavity, the surface of said cavity being the cathode.

28. The method of claim 25 wherein said cavity is elongated, said method including the step of moving said solid metal members while spraying said molten metal into said cavity.

* * * * *

UNITED STATES PATENT AND TRADEMARK OFFICE
CERTIFICATE OF CORRECTION

PATENT NO. : 5,273,204
DATED : December 28, 1993
INVENTOR(S) : Ranes P. Dalal; John M. McFadden; Mark J. Straszheim; Louis E. Dardi It is certified that error appears in the above-indentified patent and that said Letters Patent is hereby corrected as shown below:

In claim 1, column 8, line 18, change "sid" to --said--.

Signed and Sealed this

Seventh Day of June, 1994

Attest:

BRUCE LEHMAN

Attesting Officer     Commissioner of Patents and Trademarks